United States Patent [19]

Kott

[11] 4,376,936
[45] Mar. 15, 1983

[54] SEARCH SYSTEM FOR RANDOMLY CLASSIFIED OBJECTS

[76] Inventor: Jacques Kott, 61, rue Bagnolet, 75020 Paris, France

[21] Appl. No.: 194,026

[22] Filed: Oct. 6, 1980

[30] Foreign Application Priority Data

Oct. 5, 1979 [FR] France .................. 79 24818

[51] Int. Cl.$^3$ ............ H04Q 9/00; G06K 13/20
[52] U.S. Cl. ................. 340/825.3; 235/492
[58] Field of Search .......... 340/149, 152 R, 147 R, 340/147 P, 147 A, 825.36, 825.35; 353/26 A, 25; 209/610; 235/492

[56] References Cited

U.S. PATENT DOCUMENTS

| | | | |
|---|---|---|---|
| 1,650,058 | 11/1927 | Whetstone | 40/72 |
| 3,283,571 | 11/1966 | Powell | 235/492 |
| 3,416,535 | 12/1968 | Kalthoff et al. | 137/549 |
| 3,573,739 | 4/1971 | Zeitlin | 340/152 R |
| 3,702,464 | 11/1972 | Castrucci | 235/492 |
| 3,731,063 | 5/1973 | Bickl et al. | 353/26 A |
| 3,921,139 | 11/1975 | Hardesty, Jr. et al. | 340/152 R |
| 4,004,133 | 1/1977 | Hannan et al. | 235/441 |
| 4,025,176 | 5/1977 | Lopata | 353/26 A |
| 4,164,630 | 8/1979 | Brodbeck | 340/147 A |

FOREIGN PATENT DOCUMENTS 690244 3/1940 Fed. Rep. of Germany .
2359464 2/1978 France .

*Primary Examiner*—Donald J. Yusko
*Attorney, Agent, or Firm*—Young & Thompson

[57] ABSTRACT

The present invention concerns a system for the search for randomly classified objects such as documents which are provided with a classification code, and comprises a control device 1 which is to emit a signal corresponding to the code of the object being sought and at least one locating device 10, 20, 70 associated to each object, each locating device 10, 20, 70 being constituted by a memory device 11, 21, 71 wherein has been stored the code of the object and a comparison device 12, 22, 72 for the comparison of the code contained in the memory device with the code obtained from the signal emitted by the control device, and to emit a signal which controls a detection device 13, 23, 73 which is interdependent with the sought object.

5 Claims, 4 Drawing Figures

SEARCH SYSTEM FOR RANDOMLY CLASSIFIED OBJECTS

The present invention concerns a system to search for objects which are randomly classified. The present invention particularly concerns a system which allows immediate discovery either of a document such as a docket, microfiche, file, book or the like, or of any other object such as separate and detached pieces, medications or the like, which have been arranged randomly in a classification device without taking into consideration the codification for classification of the document.

Traditionally, documents are provided with a numeric or alpha-numeric code corresponding to the classification adopted by the user and are arranged as a function of this code in a classification device such as shelving, cabinets, card index boxes, drawers or the like, as a function of the object being classified, to facilitate the search for the objects or documents. In order to be able to rapidly find the object which is sought, the object must be arranged at the predetermined location according to its code, in other words at a fixed location. Then, generally, the objects are manually classified, allowing risk of error, and that results in a time loss during the subsequent search for the object. This loss of time is proportionally more prejudicial with increase of the number of classified objects. To increase the search speed, it has been proposed to provide the classification devices with pivoting or rotating devices or the like, indexation selection devices, or the like. None of the known systems, however, allows easy and immediate location of an improperly classified object. Search systems have already been proposed for finding randomly classified documents, such as boxes of dockets provided with electric detection devices or mechanical systems for the classification drawers. These systems, however, each apply to only one specific type of document, and are of limited use.

The object of the present invention is to remedy these drawbacks by providing a system for the search for classified objects which are randomly classified which allows easy and rapid location of a classified object in a classification device, but independently of its classification code.

Another object of the present invention is to provide a system for search for randomly classified objects provided with a classification code, characterized in that it comprises a control device intended to emit a signal corresponding to the code or address of the object which is sought and at least one locating device associated with each object, each locating device being constituted of a memory device wherein has been stored the code or address of the object and by a comparison device to compare the code or address contained in the memory device with the code or address obtained from the signal emitted by the control device, and to emit a signal which controls a detection device which is integral with the object sought. Thus, the locating device can also include a receiver device which transforms the signal coming from the control device into a code which is acceptable by the comparison device. The memory device can be a programmable memory device or a read-only memory device (ROM). A programmable memory allows the user to give the selected code to each object, i.e. to each locating device. A read-only memory will be used preferably in the case wherein a pre-addressing of an assembly of location devices is possible.

According to one preferred embodiment of the present invention, the control device is constituted by an entry device for data for entry of the code or address of the sought object as well as the function to be realized, and by a transmitter which is intended to transmit a function signal of the code or address and the entered functions to the locating devices. The data entry device can be constituted by an entry device of the keyboard type while the transmitter device is a coding device. However, the control device can also be a programmable unit.

On the other hand, the interdependent device for detection of the object preferably includes a display device such as an electroluminescent diode or the like. Any detection device which is directly perceptible to the user can be used.

Other characteristics and advantages of the present invention will appear in the following description of various embodiments of the present invention, with reference to the accompanying drawings, wherein.

Figure 1:
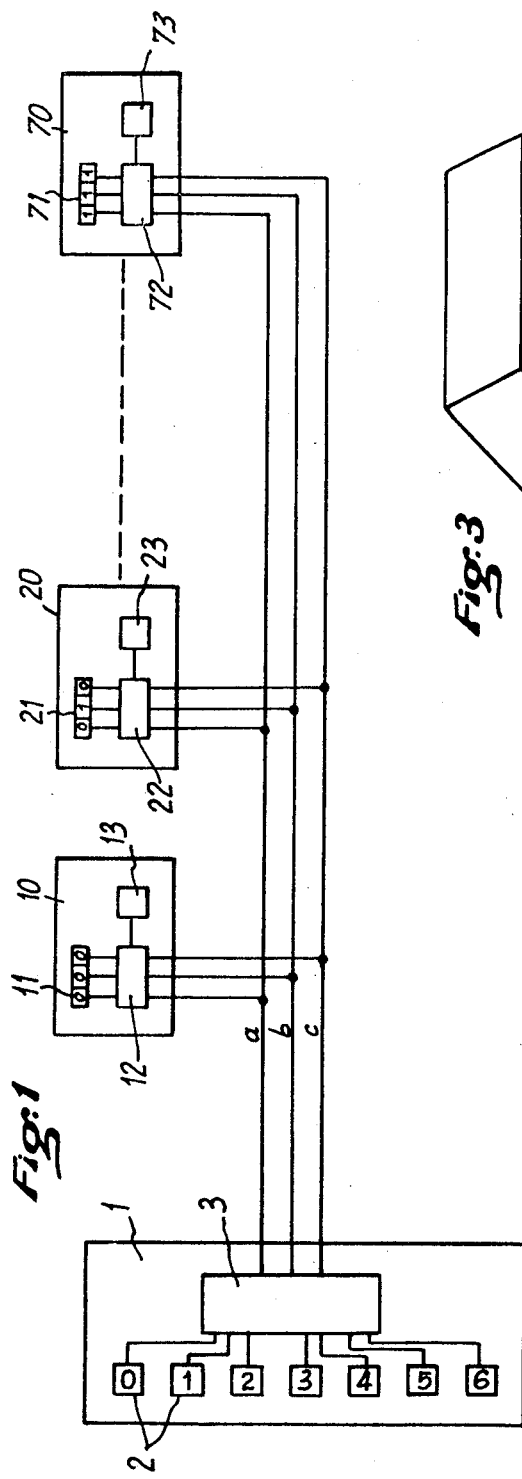
FIG. 1 is a block diagram of the electric circuit of a search system for objects classified randomly in a first embodiment.

FIG. 1 shows the electrical diagram of a first embodiment of a system for the search for randomly classified objects, according to the present invention. For simplification, this system shows a search for only seven objects; however it will be obvious to a person skilled in the art that it can be easily adapted to a large number of objects. In the present invention, the search system comprises a control device 1 and seven locating devices 10, 20 . . . 70. The control device is constituted in the present case of a simple data entry unit of a keyboard 2 with seven keys and a coding unit 3, each key being connected to the coding unit in such a manner as to emit a binary coded signal corresponding to the key pressed. The binary coded signal is transmitted on a series of conductive lines a, b, c (three only in the embodiment shown), to which are detachably connected the locating devices 10, 20, . . . 70. Each locating device comprises a memory device 11, 21, . . . 71, which is constituted by a register of three binary positions wherein has been stored a code or address, in other words the code 001 memory device 11, code 010 for memory device 21 and code 111 for memory device 71. Each memory device is connected to a comparison device 12, 22, . . . 72. The comparison device effects a comparison between the code contained in the memory device of the locating device and the code corresponding to the signal transmitted by control device 1. If the two codes are equivalent, the comparison device emits a signal toward one of the detection devices 13, 23, . . . 73, which then allows location of the sought document. Thus, for example, if the user pushes the button 2, code 010 is emitted onto lines a, b, c. Then this code corresponds to code 010 stored in memory device 21 of the locating device 20.

Because of this, detection system 23 allows the document which is coded 2 to be found, wherever this document has been classified.

Figure 2:
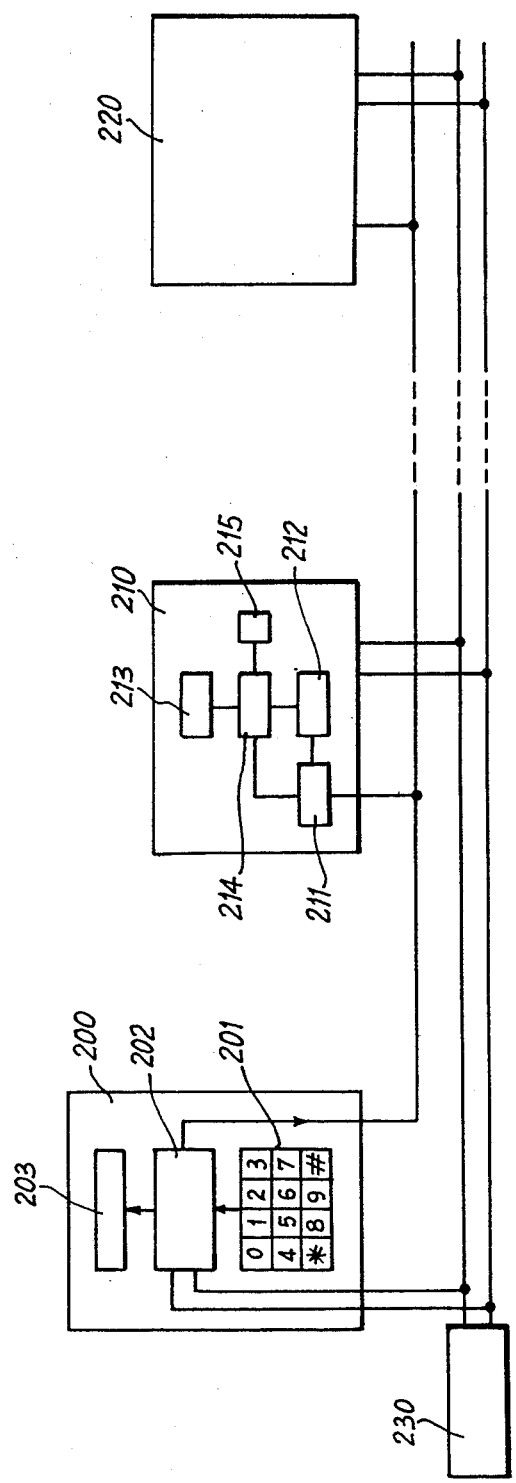
FIG. 2 is a block diagram of another embodiment of the electric circuit of a system for the search for randomly classified objects.

FIG. 2 shows the electrical diagram of the search system for randomly classified objects provided by the invention and used in the case of suspended files. This system is the same as the system of FIG. 1 in its control device 200 and a plurality of locating devices, of which only two, devices 210 and 220, have been shown, to simplify the drawing. The connection of the control device 200 to locating devices 210, 220, . . . is realized by a feed 230 which is connected respectively through two conductive wires to the control device and to the various locating devices.

The nature of the control device and of the locating devices associated with each object to be searched will now be described in more detail. Control device 200 includes a data entry device which is a keyboard 12 with keys 201 comprising ten numeric keys, so as to enter a numeric code, and two function keys, used respectively for the execution of a search or for the repetition of transmission of the code which is entered. The numeric key zero is also used to return the system to zero. Keyboard 201 is connected to a microprocessor 202 which treats the data entered by keyboard 201 and emits a signal as a function of the entered data, by means of a conductive line, toward the various locating devices. Microprocessor 202 is connected to a display device 203 which permits the display and consequently the verification of the numeric code entered by the keyboard. Microprocessor 202 is in fact constituted of a microprocessor, a memory containing the programs of the different steps to be executed, such as display, transmission, etc., and decoder circuits to decode the data transmitted by keyboard 201 toward display device 203. On the other hand, each location device associated with an object is constituted of an analyzer 211, to analyze the signal transmitted by the control device, a translator 212, connected to the analyzer and adapted to furnish a code corresponding to the code being sought, from the signal transmitted by the control device, a memory 213 carrying the specific code of the object, a comparator-translator 214, connected respectively to the translator and to the memory, the comparator being adapted to furnish a comparison signal when the specific code of the object is equal to the code sought, and a luminous viewer 215, lighted by the comparison signal, all as shown in device 210. In fact, this system functions in a similar manner to the system of FIG. 1. The use of a microprocessor in the control device permits utilization of codes of several digits. On the other hand, the display device 203 allows verification of the code entered by the keyboard, to see whether it actually corresponds to the code sought.

Figure 3:
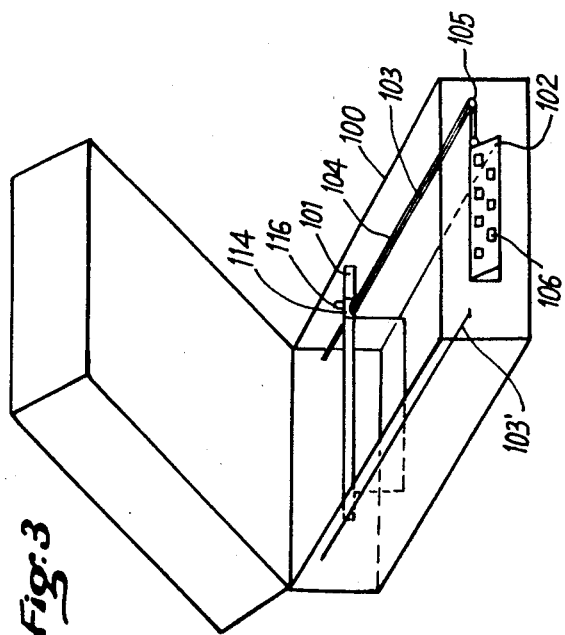
FIG. 3 is a perspective view of a card index box for microfiches or dockets, provided with a search system for randomly classified objects according to the present invention.
Figure 4:
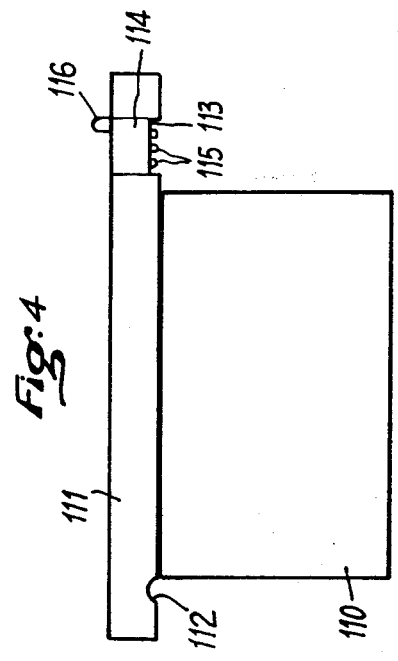
FIG. 4 is an elevational view of a case for dockets or microfiches provided with the locating device of the present invention.

FIGS. 3 and 4 show application of a serach system for randomly classified objects of the described type in card index boxes for dockets or microfiches. The system is composed of a box of dockets 100, an assembly of cases for dockets or microfiches 101 and a control device 102. The docket box 100 is a conventional box wherein has been mounted a small plate 103 carrying a series of conductive lines 104 running the length of the box. Small plate 103 as shown in FIG. 3 can be placed on supports provided in the front and rear inside surfaces of the docket box. Plate 103 can be either integral with or mounted to slide in the side wall of the box. In any case, plate 103 terminates in a connector 105, to connect it to control device 102. Control device 102 can either be integral with the box, as in the embodiment shown, or can be connected to the box by means of a cable. In its simplest form, it comprises a keyboard with keys 106, allowing entry of the code or the address code of the sought document. The control device can also include a display device such as liquid crystals or the like, which allows viewing of the results of the operations.

As shown in FIG. 4, the cases for dockets intended to be classified in the box are cases of transparent, flexible or semi-rigid material 110, adapted to receive the docket or microfiche to be classified. Case 110 is affixed to a support element 111 provided with two notches 112, 113, to suspend the case in the box on plate 103 and on a guide rail 103' on the opposite side. Support element 111 carries a locating device 114. Locating device 114 can be a printed circuit carrying a detection logic of the type described above, in the form of an integrated circuit. Locating device 114 is mounted on support element 11 at the level of notch 113 and is connected to the conductive lines of the plate by means of contacts 115. The locating device is provided with a sighting device 116 which allows the immediate location of the detected docket. Of course, the locating device can be positioned in different ways on the support element as a function of the shape of the box of documents or the like.

It will be obvious to a person skilled in the art that the system can be applied to the search for all objects, such as files classified in a cabinet, books classified on shelving, detached items on shelves, etc., the only constraint being that the locating device must be integral with or at least associated with the object.

What is claimed is:

1. A system for the search for randomly classified objects, each object being movable and having a classification code, comprising a central control device for emitting a signal corresponding to the code of the object which is sought, an independent locating device fixed on each object and adapted to be connected with the control device whatever is the place of the object in a filing device, the locating device comprising a memory device wherein has been stored the classification code of the object, a comparison device for comparing the code contained in the memory device with the code obtained from the signal emitted by the control device and an indicator device operating upon coincidence of the two codes.

2. A system for the search for randomly classified objects as claimed in claim 1, in which the locating device also comprises a receiver device which is capable of transforming the signal coming from the control device into a code which is acceptable by the comparison device.

3. A system for the search for randomly classified objects as claimed in claim 1, in which the control device comprises a data entry system adapted to enter the code of the object which is sought as well as the functions to be performed and a coder device adapted to transform the code as entered into a signal to transmit toward the locating device.

4. A system for the search for randomly classified objects as claimed in claim 3, in which the coding device is constituted by a microprocessor.

5. A system for the search for randomly classified objects as claimed in claim 1, in which the indicator device is a visible display device.

* * * * *